US010805305B2

(12) United States Patent
Birur

(10) Patent No.: US 10,805,305 B2
(45) Date of Patent: Oct. 13, 2020

(54) DETECTION OF OPERATIONAL THREATS USING ARTIFICIAL INTELLIGENCE

(71) Applicant: Apatics, Inc., San Ramon, CA (US)

(72) Inventor: Theja Birur, San Ramon, CA (US)

(73) Assignee: APATICS, INC., San Ramon, CA (US)

( * ) Notice: Subject to any disclaimer, the term of this patent is extended or adjusted under 35 U.S.C. 154(b) by 0 days.

(21) Appl. No.: 16/269,514

(22) Filed: Feb. 6, 2019

(65) Prior Publication Data

US 2019/0243969 A1 Aug. 8, 2019

Related U.S. Application Data

(60) Provisional application No. 62/627,547, filed on Feb. 7, 2018.

(51) Int. Cl.
*H04L 29/02* (2006.01)
*H04L 29/06* (2006.01)
*G06F 21/55* (2013.01)
*G06N 20/00* (2019.01)

(52) U.S. Cl.
CPC .......... *H04L 63/102* (2013.01); *G06F 21/552* (2013.01); *G06N 20/00* (2019.01); *H04L 63/104* (2013.01); *G06F 2221/034* (2013.01)

(58) Field of Classification Search
CPC .............................. H04L 63/102; H04L 63/104
See application file for complete search history.

(56) References Cited

U.S. PATENT DOCUMENTS

| 8,655,823 | B1* | 2/2014 | Kumar | G06F 21/554 |
| | | | | 706/46 |
| 9,032,531 | B1* | 5/2015 | Scorvo | G06F 21/55 |
| | | | | 726/25 |
| 10,015,171 | B1* | 7/2018 | Vardy | H04L 63/102 |
| 10,069,842 | B1* | 9/2018 | Bradley | G06F 17/2785 |

(Continued)

OTHER PUBLICATIONS

Herland, Matthew; Bauder, Richard A.; Khoshgoftaar, Taghi M.; "Medical Provider Specialty Predictions for the Detection of Anomalous Medicare Insurance Claims", International Conference on Information Reuse and Integration (IRI), IEEE, Aug. 4-6, 2017, pp. 579-588.*

(Continued)

*Primary Examiner* — Victor Lesniewski
(74) *Attorney, Agent, or Firm* — Kilpatrick Townsend & Stockton LLP

(57) ABSTRACT

A set of resource requests that each includes authorization-supporting data for receiving a requested resource can be received. For each request, augmenting data associated with part of the data is retrieved, and it is determined whether access is authorized based on the augmenting data and the authorization-supporting data. A machine-learning model is trained using representations of the set of resource requests and the authorization determinations. Additional requests are processed by the trained model to generate corresponding authorization outputs. One or more identifiers to flag for inhibition of resource access are determined based on the authorization outputs. Upon detecting that a new resource request to access a particular resource includes an identifier of the one or more identifiers, a new authorization output is generated to inhibit access to the particular resource.

20 Claims, 6 Drawing Sheets

(56) References Cited

U.S. PATENT DOCUMENTS

| | | | | |
|---|---|---|---|---|
| 2012/0185275 | A1* | 7/2012 | Loghmani | G06F 19/328 |
| | | | | 705/3 |
| 2014/0129256 | A1* | 5/2014 | Veren | G16H 40/20 |
| | | | | 705/3 |
| 2014/0149128 | A1* | 5/2014 | Getchius | G06Q 50/22 |
| | | | | 705/2 |
| 2016/0012544 | A1* | 1/2016 | Ramaswamy | G06Q 40/08 |
| | | | | 705/4 |
| 2016/0110818 | A1* | 4/2016 | Shemesh | G06Q 40/08 |
| | | | | 705/4 |
| 2016/0125149 | A1* | 5/2016 | Abramowitz | G06F 19/328 |
| | | | | 705/3 |
| 2017/0091658 | A1* | 3/2017 | Matthiesen | G06F 21/00 |
| 2017/0093920 | A1* | 3/2017 | Ducatel | G06F 21/316 |
| 2017/0154374 | A1* | 6/2017 | Iglesias | G06Q 30/0629 |
| 2017/0302679 | A1* | 10/2017 | Caramico | H04L 63/105 |
| 2018/0007053 | A1* | 1/2018 | Grant | H04L 63/101 |
| 2018/0039904 | A1* | 2/2018 | Stevens | G06N 5/04 |
| 2018/0069867 | A1* | 3/2018 | Grajek | G06N 20/00 |
| 2018/0337927 | A1* | 11/2018 | Carnahan | G06K 9/6259 |
| 2018/0357563 | A1* | 12/2018 | Kurian | H04L 63/102 |
| 2018/0375886 | A1* | 12/2018 | Kirti | H04L 63/1425 |
| 2019/0005198 | A1* | 1/2019 | Richards | G06F 19/328 |
| 2019/0114715 | A1* | 4/2019 | Hessinger | G06Q 40/08 |
| 2019/0244706 | A1* | 8/2019 | Wilson | G16H 10/40 |

OTHER PUBLICATIONS

Bauder, Richard A.; Khoshgoftaar, Taghi M.; Richter, Aaron; Herland, Matthew; "Predicting Medical Provider Specialties to Detect Anomalous Insurance Claims", 28th International Conference on Tools with Artificial Intelligence (ICTAI), IEEE, Nov. 6-8, 2016, pp. 784-790.*

Francis, Charles; Pepper, Noah; Strong, Homer; "Using Support Vector Machines to Detect Medical Fraud and Abuse", Annual International Conference of the IEEE Engineering in Medicine and Biology Society, IEEE, Aug. 30-Sep. 3, 2011, pp. 8291-8294.*

\* cited by examiner

DETECTION OF OPERATIONAL THREATS USING ARTIFICIAL INTELLIGENCE

CROSS-REFERENCE TO RELATED APPLICATIONS

This application claims the benefit of and the priority to U.S. Provisional Application No. 62/627,547, filed on Feb. 7, 2018, which is hereby incorporated by reference in its entirety for all purposes.

FIELD

Methods and systems disclosed herein relate generally to using artificial intelligence to detect indicators of incoming requests threatening an operational stability of a system.

BACKGROUND

Computer systems are increasingly relied upon to quickly process an exponentially increasing number of resource requests. In addition to specifically identifying a resource being requested, each request may include information that allegedly indicates that access to the requested resource is authorized based on one or more predefined rules. Determining whether the requestor is actually authorized to make the specific request is complicated for multiple reasons. For example, some rules may be based upon an extent to which some or all requests corresponding to a given requestor or entity match a predetermined alert signature. As another example, some or all of the data within the request may be inaccurate.

SUMMARY

In some embodiments, a computer-implemented is provided. Receipt of each of a set of resource requests is detected. Each resource request of the set of resource requests includes one received from a user device and that includes an identification of a requested resource and authorization-supporting data for receiving the requested resource. The authorization-supporting data includes one or more characterizing parameters that characterize one or more events. For each resource request of the set of resource requests, augmenting data is retrieved from a data source or data structure that is separate from the user devices from which the set of resource requests were received. The augmenting data is associated with a characterizing parameter of the one or more characterizing parameters included in the resource request. Further, for each resource request of the set of resource requests, a representation of the resource request is generated that includes a set of key-value pairs. Each of at least some of the set of key-value pairs includes a value extracted from or derived from the resource request. A machine-learning model is trained using the representations of the set of resource requests and augmenting-based data that includes or is derived from the augmenting data. The trained machine-learning model includes a dependency between one or more first keys identified in the set of key-value pairs and an output. For each other resource request in another set of resource requests, another representation of the other resource request is processed using the trained machine-learning model to generate an authorization output. Based on a population analysis of the authorization outputs, one or more identifiers (that do not correspond to the one or more first keys) are identified to flag for inhibition of resource access. A new resource request is detected that includes an identifier of the one or more identifiers. The new resource request identifies a particular resource and corresponds to a particular entity. A new authorization output is generated for the new resource request. Release of the new authorization output results in inhibiting the particular entity from access the particular resource.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
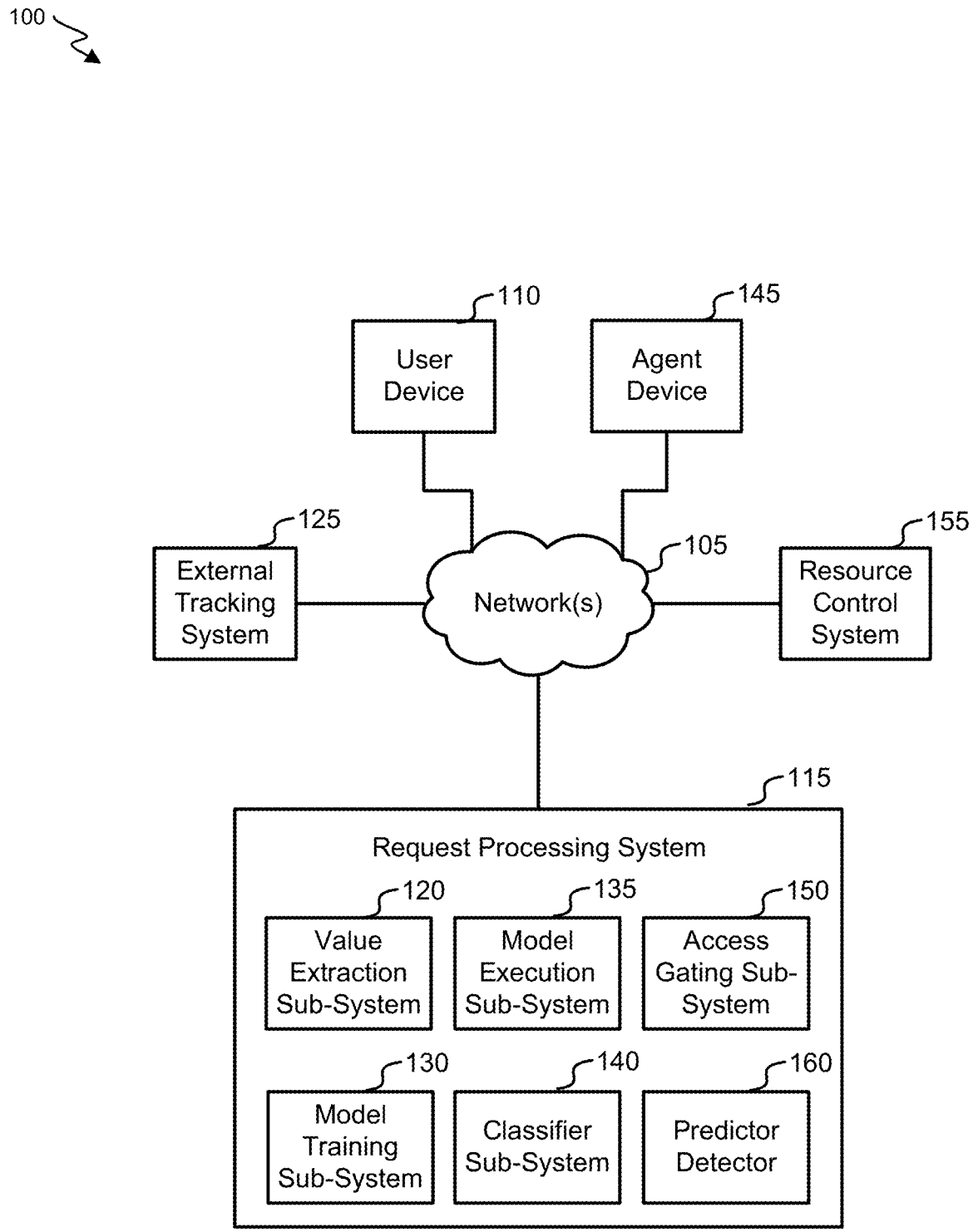
FIG. 1 shows a system for gating resource access in accordance with some embodiments of the invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

FIG. 1 shows a system 100 for gating resource access in accordance with some embodiments of the invention. System 100 includes multiple devices and systems that are connected over one or more networks 105 (e.g., the Internet, a local-area network a wide-area network, a wireless network and/or a short-range network) to gate access to resources via processing of resource requests.

A resource request can be generated at and transmitted by a user device 110 (e.g., computer, portable electronic device, server, or computer system). The resource request can identify a particular resource being requested and can further include authorization-supporting data, which can include one or more characterizing parameters that characterize one or more events. Resources can be gated using a rule base that includes a set of rules. The set of rules can include specifications of events that are (or are not) sufficient to trigger resource release. Thus, characterizing parameter(s) may correspond to at least some of the specifications defined in the rule base. The characterizing parameter(s) may identify (for example) a date of an event, a type of the event, a circumstance indicating why the event was performed, an outcome of the event, and/or one or more entities associated with the event. In some instances, the resource request is transmitted via a portal, such as an online portal.

The resource request can be transmitted to a request processing system 115, which can process the request to determine whether to authorize access to the requested (e.g., gated) resource. More specifically, request processing system 115 can include a value extraction sub-system 120 that extracts values from the request. A value that is extracted by value extraction sub-system 105 can include a characterizing parameter included in the request. A value that is extracted by value extraction sub-system 105 can include an identifying property of a requested resource, such as a type, quantity or amount. A value that is extracted can include a value extracted from metadata of the request. For example, the value may include a time of day that the request was transmitted; a date on which the request was transmitted; a time zone that corresponds to a location from which the request was transmitted; a geographical location at which user device 110 was located when the request was transmitted; an IP address of user device 110; etc. The value can be extracted from a request and/or its metadata based on (for example) a known structure, an inferred structure, format mapping, etc.

In some instances, value extraction sub-system 120 generates a (derived) value based on one or more extracted values. For example, value extraction sub-system 120 may determine whether a request includes an identification of a referring entity, whether a time of transmission the request is within a predefined time window (e.g., between 8 am and 8 pm of a time zone local to a geographic location of the user device, as indicated or derived from another metadata value), a delta between a time (and/or date) at which the request was transmitted and a time (and/or date) at which a characterizing parameter indicated that an event occurred, etc.

In some instances, value extraction sub-system 120 generates a (derived) value based, not only on an instant request, but also on one or more related requests. For example, a value can identify a number of requests that include a same characterizing parameter that identifies an involved entity (and/or subject of an event) within a predefined time period; a number of requests from a same user device within a predefined time period; etc. In some instances, a value can be generated based on one or more past authorization outputs, such as a percentage of requests received within a predetermined time period for which an authorization output indicated that access to the requested resource was to be granted (or that access to a resource corresponding to at least a threshold percentage of an amount of the requested resource was to be granted).

Value extraction sub-system 120 can generate, for each extracted value and/or each derived value, a key-value pair. Thus, a request can be represented by a set of key-value pairs. A key of the key-value pair can identify which type of value a corresponding value is. Each key may be predefined. In some instances, value extraction sub-system 120 accesses a set of protocols. Each protocol of the set of protocols can correspond to a particular key and can identify how a corresponding value is to be extracted (e.g., based on detecting a particular format or character string) and/or derived.

Value extraction sub-system 120 can further retrieve augmenting data to augment data from a request. The augmenting data can be retrieved from a data source or data structure that is separate from user device 110. In some instances, value extraction sub-system 120 can use request-associated information (e.g., a characterizing parameter or information derived based upon one or more characterizing parameters) to retrieve augmenting data from a database managed by and/or controlled by request processing system 115. Augmenting data may be retrieved by performing a look-up using a characterizing parameter that identifies an entity performing an event. Augmenting data may relate to one or more requests previously received (e.g., which were associated with a same entity, subject and/or type of event) and/or, for each of the one or more requests, a corresponding authorization output and/or authorization result.

In some instances, value extraction sub-system 120 can use request-associated information (e.g., a characterizing parameter or information derived based upon one or more characterizing parameters) to retrieve augmenting data from an external tracking system 125. External tracking system 125 may maintain, update and control a database. The database may (for example) include information pertaining to individual entities, conditions and/or types of events. For example, the database may indicate, for each of multiple entities, whether the entity has been asserted to or determined to have participated in a fraud scheme and/or whether the entity has lost a medical license. As another example, the database may indicate, for each of multiple types of events, one or more thresholds or indications of an associated resource amount. As yet another example, the database may indicate, for each of multiple types of conditions, one or more statistics pertaining to typical event series (e.g., a typical duration of the event series performed to treat the condition, one or more types of events typically performed for the condition and/or one or more typical subject demographics for the condition).

Value extraction sub-system 120 can generate one or more augmenting key-value pairs based on the retrieved augmenting data. In some instances, a value in an augmenting key-value pair includes a retrieved value. In some instances, a value in an augmenting key-value pair is generated by processing a retrieved value (e.g., by determining whether a characterizing parameter and/or other information matches or accords with a retrieved value). For example, if augmenting data identifies an upper threshold for a typical duration of an event series corresponding to a condition identified in a request, an actual current duration can be calculated (e.g., by retrieving data corresponding to each other request associated with a same entity, subject and condition) and compared to the threshold to generate a binary value indicating whether the actual current duration is less than a threshold duration.

In some instances, request-associated data can be processed and transformed to generating a corresponding key-value pair. The processing may use additional data or information. In some instances, multiple univariate analyses—each corresponding to a different type of processing—can identify what types of input values to include in an input data set. Each univariate analysis may indicate whether and/or how an authorization output and/or request response statistically related to an output of the type of processing. In some instances, a multivariate analysis may be used to further identify relationships between types of processings. For each type of processing associated with a relationship strength (e.g., correlation coefficient, weight, coefficient) that exceeds a predefined threshold (e.g., and for which a second relationship strength between the processing type's outputs and values already represented in an input data set is below a second predefined threshold), a protocol for generating input data sets can be updated to include a key-value pair associated with the type of processing.

For example, a request may be associated with metadata that identifies a date (e.g., and time) at which the request was transmitted, and/or request processing system 115 can detect a date (e.g., and time) at which the request was received. Additional data can identify which dates correspond to federal holidays. A value for a key-value pair can be set to 1 if the date on which the request was transmitted (or received) is the same as one of the identified holidays and 0 otherwise.

An analysis on a data set of requests indicated that requests submitted on holidays were approximately twice as likely to result in a rejection of a resource request as compared to other requests (approximately 17% rejection rate versus 9%). Thus, a protocol for generating an input data set may include generating a key-value pair that includes this type of binary indicator. Subsequent assessment of learned parameters may indicate whether this type of key-value pair provides predictive and/or informative in the multi-variable context. If not, the protocol may again be modified such that type of key-value pair is no longer included in input data sets.

As another example, a processing may be performed to query a data structure or data source to determine whether a subject identified in the request has (e.g., within a predefined time window) submitted a claim for having experienced a work-related injury. If so, a status of the claim can further be retrieved. A key-value pair can be configured to differentially identify: when no such claim was submitted within the time window; when a claim submitted within the time window was accepted; and when a claim submitted within the time window was rejected. An analysis may show that rejected claims are associated with an increased probability that a resource request will be rejected.

A model training sub-system 130 can use multiple sets of key-value pairs (corresponding to multiple requests) and augmenting data to train a machine-learning model. The machine-learning model can include (for example) include a regression model (e.g., linear-regression model or logistic-regression model), a discriminant-analysis model (e.g., linear discriminant analysis model), a decision-tree model (e.g., using a classification tree or regression tree), a Naïve Bayes model, a nearest-neighbor model (e.g., using a K-Nearest Neighbors algorithm or K-means algorithm), a neural-network model (e.g., using a Learning Vector Quantization algorithm, feed forward network, deep neural network, recurrent neural network, neural network with one or more memory cells and/or deconvolutional network), a feature-transformation technique (e.g., using principal component analysis or independent component analysis), a support vector machine, a Random-Forest model, a model learned using Shannon entropy (e.g., by measuring entropy during Bayesian learning or decision-tree learning and/or by representing a loss function using cross entropies across two, more or all data sets), and/or an ensemble model.

The machine-learning model can have a static base configuration and be defined based on one or more hyperparameters that are not learned and that are instead set. For example, a hyperparameter can include a learning rate or number of layers in a network. Meanwhile, a set of parameters (e.g., a set of weights, a set of support vectors or a set of coefficients) of the machine-learning model are learned through training.

The machine-learning model can be configured to receive and process individual input data sets, each of which include augmenting data corresponding to a given request and a set of values from a key-value representation of the given request. The machine-learning model can be configured to generate an output that includes or can be used to derive an authorization output. For example, an output may include a cluster or classification that corresponds to a discrete type of authorization (e.g., approved or denied) or an identification of another request data set corresponding to the input data set (e.g., such that an authorization output for the other request data set can be selected for the input data set as well. As another example, an output can include a numeric score, where high scores correspond to high confidence that access to a requested resource is authorized. As yet another example, an output can include a numeric percentage indicating a fraction of an amount of a resource being requested that are recommended to be authorized.

Model training sub-system 130 can learn parameters using supervised learning, unsupervised learning or semi-supervised learning. For example, an unsupervised-learning technique may be used when training a model configured to assign each input data set to a particular cluster. A hyperparameter may (but need not) specify a total number of clusters. A hyperparameter and/or model structure may specify whether an individual input data set can be assigned to multiple clusters (and/or a threshold identifying a number of clusters to which an input data set can be assigned). As another example, a semi-supervised learning technique may be used to learn a particular label to each cluster, and an output can include the label. A semi-supervised learning technique may further inform learning decisions as to whether a given cluster is to be split into multiple clusters or whether two or more clusters are to be merged into a single cluster. As yet another example, a training data set can include an output for each input data set, such that the model can be trained using supervised learning. The output can indicate (for example) a type of final response sent or generated in response to an instant request (e.g., indicating whether the request was approved and/or a percentage of a requested resource amount approved).

Training may be performed during one or more discrete time intervals or continuously (e.g., and while the machine-learning model is being executed). In some instances, training data (e.g., that includes multiple input data sets and possibly multiple outputs) used to train the machine-learning model is completely different than data corresponding to execution of the trained machine-learning model. For example, training data can include a first plurality of input data sets and potentially a corresponding first plurality of outputs or authorization indicators (e.g., as identified based on input or automatic tracking), and after training, the machine-learning model can process a separate second plurality of input data sets to generate a second plurality of outputs. In some instances, training data partly overlaps with data corresponding to execution of the trained machine-learning model. For example, each input data set included in the training data may correspond to an input data set processed by the machine-learning model, but at least some of the outputs included in the training data may differ from that which was generated by the model (e.g., and instead include output data as identified via input and/or as tracked through response monitoring).

A model execution sub-system 135 can use the trained machine-learning model to process individual input data sets (e.g., and augmenting data) to generate corresponding one or more outputs. The execution can use the learned parameter(s). The one or more outputs may (for example) include an identifier of a cluster, a classification, a binary identifier and/or a number. Input data sets processed by the trained machine-learning model may be of a same type and format as input data sets used to train the machine-learning model. Similarly, in instances in which the machine-learning model is trained using a supervised or semi-supervised protocol, outputs generated by the trained machine-learning model may be of a same type and format as outputs used to train the machine-learning model.

The machine-learning model can be configured to generate an output that includes or can be used to derive an authorization output. For example, an output may include a cluster or classification that corresponds to a discrete type of authorization (e.g., approved or denied) or an identification of another request data set corresponding to the input data set (e.g., such that an authorization output for the other request data set can be selected for the input data set as well. As another example, an output can include a numeric score, where high scores correspond to high confidence that access to a requested resource is authorized. As yet another example, an output can include a numeric percentage indicating a fraction of an amount of a resource being requested that are recommended to be authorized.

In some instances, an output generated by the machine-learning model is further processed. For example, a classifier sub-system 140 can use the output(s) generated in association with a given request to identify a particular classification amongst multiple defined clusters (e.g., each corresponding to a particular response recommendation) for the request. To illustrate, an output may include a numeric score and/or one or more weights or eigenvalues that can be translated (e.g., using a static or learned transformation) to a category identifier.

In some instances, classifier sub-system 140 itself learns one or more parameters in a transformation machine-learning classification model. The learning can be conducted using supervised, semi-supervised or unsupervised learning. The transformation machine-learning classification model can be configured to identify a class or cluster from amongst a predefined set of classes or a learned number of classes. For example, a set of classes can include: approve in full; approve in part or reject.

In some instances, an output generated by the machine-learning model or a class or cluster as identified in post-processing may indicate that additional review is to be performed. For example, predefined output clusters and/or predefined classes may indicate that a request is to be (1) approved; (2) approved in modified form; (3) declined; or (4) subject to further evaluation. As another example, additional review may be conducted for each request. When additional review is to be performed, request processing system 115 may queue up additional evaluation for the request and transmit information pertaining to the request to an agent device 145. The information pertaining to the request can include (for example) one or more characterizing parameters, a requested resource, other request data, request-associated metadata, augmenting data, an output from the machine-learning model and/or an identified cluster or class. Agent device 145 may correspond to an agent (e.g., human) user and/or agent device assigned by request processing system 115 or another system using (for example) a load-balancing or round-robin approach.

Agent device 145 can include a device associated with and/or operated by an agent of an entity associated with request processing system 115. In some instances, agent device 145 can request and receive additional augmenting data (e.g., from external tracking system 125, user device 110, request processing system 115 or another device). Subsequent to processing of the received information, agent device 145 can identify a response output based on input received at the device, The response output can (for example) identify a cluster, class or authorized resource (e.g., amount). The response output can indicate that a response corresponding to an authorization output generated by the machine-learning model is one of accepted, revised or rejected (e.g., in lieu of an alternative response as indicated in the response output). The response can be transmitted back to request processing system 115.

The machine-learning model can be configured to generate an output that includes or can be used to derive an authorization output. For example, an output may include a cluster or classification that corresponds to a discrete type of authorization (e.g., approved or denied) or an identification of another request data set corresponding to the input data set (e.g., such that an authorization output for the other request data set can be selected for the input data set as well. As another example, an output can include a numeric score, where high scores correspond to high confidence that access to a requested resource is authorized. As yet another example, an output can include a numeric percentage indicating a fraction of an amount of a resource being requested that are recommended to be authorized.

In some instances, an access gating sub-system 150 can use an output, a result generated by model execution sub-system 135 and/or classifier sub-system 140, and/or a response from agent device 145 to generate a resource-gating instruction and/or a response to a corresponding request. Access gating sub-system 150 can cause the resource-gating instruction to be transmitted to a resource control system 155, which controls access to resources. The resource-gating instruction can identify (for example) a resource to be (or not to be) released (e.g., which may include an amount of a resource), a final destination that is to receive the resource (e.g., which may include or relate to an entity identified in a resource request and/or an entity corresponding to a user device from which the request was received), and/or a channel or mode by which the resource is to be provided. In some instances, resource control system 155 includes or controls a financial institution. Resource control system 155 can confirm whether request processing system 115 is authorized to provide resource-gating instruction (e.g., based on an IP-address look-up, password verification, etc.). If such authorization is confirmed, transfer of a given resource can be initiated. If no transfer is to occur, a corresponding resource can be non-initiated, inhibited or prevented.

Access gating sub-system 150 can further generate a response communication to be transmitted to user device 110. The response communication can identify the request being responded to, whether resource access is granted or rejected, a characteristic (e.g., amount) of a resource to which access is granted, and/or a rationale for any part of the response.

In some instances, a data structure or database is updated to indicate an automatic or agent-dependent response provided in response to a request (e.g., to facilitate subsequent training). The data structure or database can be used, for example, to further train the machine-learning model.

A predictor detector 160 can use (for example) requests, key-value pairs, input data, learned parameters, augmenting data, agent-response data and/or response data (and/or resource-release data) to identify one or more predictors of resource release and/or how one or more of these variables affect release. For example, predictor detector 160 can identify each characterizing parameter and/or type of augmenting data that is associated with a learned weight or learned coefficient that exceeds a predetermined threshold. As another example, predictor detector 160 can use an algorithm or a machine-learning algorithm to learn how authorization outputs relate to types of final request responses (e.g., which may be based on a response from agent device 145). The relationship can include mapping cluster-identifier outputs to different types of responses or identifying one or more thresholds that can be used to transform numeric authorization outputs to clusters of types of responses.

In one particular example, a request from user device 110 identifies a requested amount of payment from an insurance provider for a particular medical service (included as a characterizing parameter in the request) performed by a medical-provider entity (included as a characterizing parameter in the request) for a patient subject (included as a characterizing parameter in the request) on a particular date (included as a characterizing parameter in the request) due to the subject experiencing a particular health condition or ailment (included as a characterizing parameter in the request). Value extraction sub-system 120 can extract each of these characterizing parameters and retrieve augmenting data from a database that indicates whether a medical license of the entity is active and/or has previously been revoked. Value extraction sub-system 120 can further retrieve augmenting data that indicates types of services approved for the condition and a range for a quantity of services typically performed to resolve the condition. Extracted values and the augmenting data can be processed using a trained machine-learning model. The machine-learning model can include, an ensemble model that first identifies, for each of multiple learned principal components, a component score based on the input data set and that second uses a neural network to transform the component scores to a single overall numeric score on a scale extending from a lower threshold representing high confidence that the request is to be rejected to an upper threshold representing high confidence that the request is to be approved. An overall score within a middle range of the scale can trigger the request to be queued for additional review by agent device 145. Predictor detector 160 can perform population analyses across data pertaining to multiple requests (e.g., including characterizing parameters, component scores, augmenting data, overall scores and/or agent-identified responses) to identify entities suspected of participating in a fraudulent scheme (e.g., based on a number or percentage of requests being rejected within a predefined time period and/or based on an amount of a resource requested in each of one or more requests exceeding a corresponding approved amount by at least a threshold degree across one, more or all requests). Identifiers of any of these entities can then be flagged, which may (for example) automatically trigger agent reviews for each subsequently received request associated with the entity.

Figure 2:
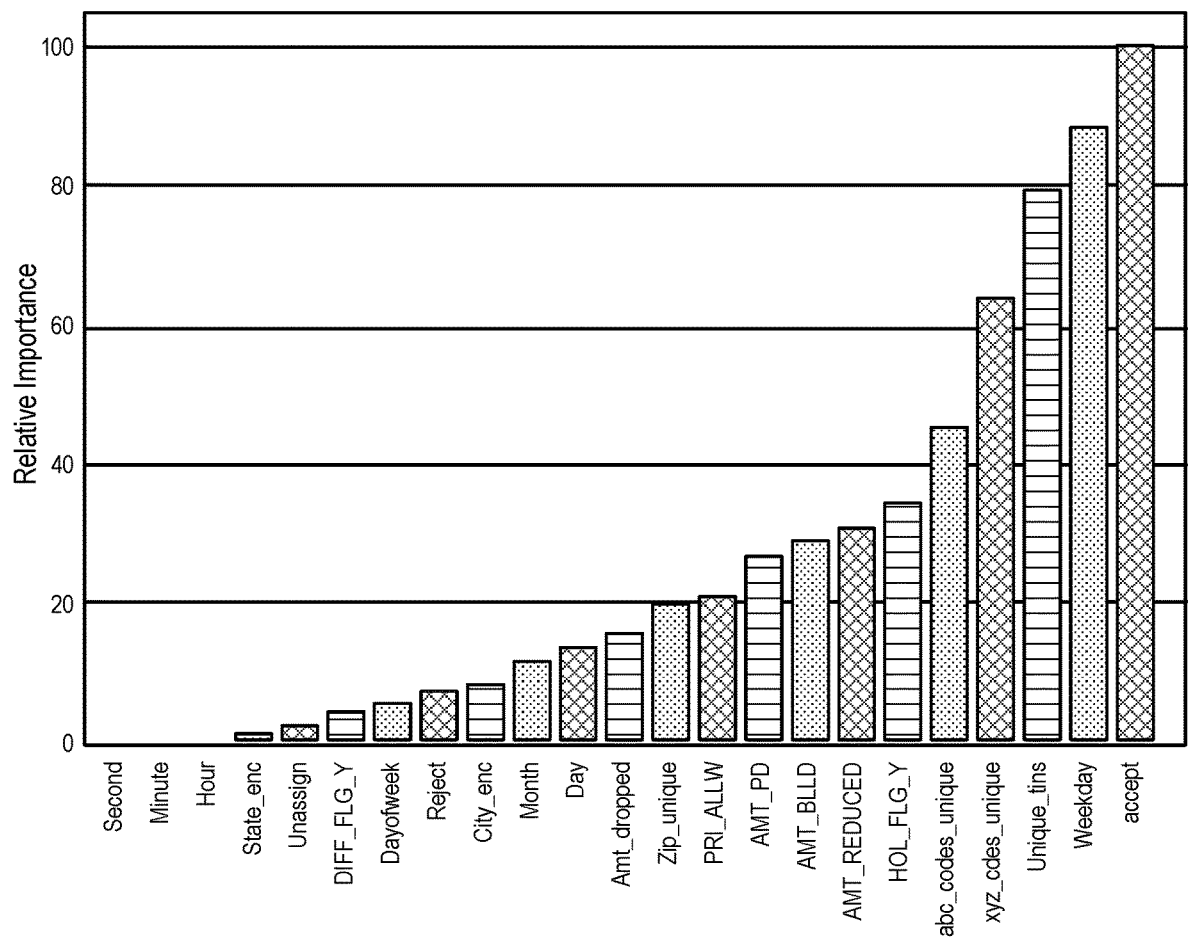
FIG. 2 represents an exemplary weights associated with various key-value pairs.

FIG. 2 represents an exemplary weights associated with various key-value pairs. In some instances, each weight corresponds to (and/or is equal to) a parameter learned by the machine-learning model. In some instances, a set of learned parameters can be used to identify the weights (e.g., by performing a correlation or regression analysis using generated authorization outputs and values of individual key-value pairs from input data sets). In some instances, an investigatory protocol can be implemented to identify the weights. For example, test input data sets can be constructed such that one or more particular distributions of values in one or more pairs are achieved (e.g., to achieve a flat or normal distribution of a given key-value pair across an associated range while holding values of other key-value pairs constant at a single value or at multiple values so as to generate a grid-like sampling of various values within the input data set). The data shown in FIG. 2 indicates that an hour key-value pair, a minute key-value pair and a second key-value pair (corresponding to an hour, minute and second at which a request was received) are not informative as to whether a requested resource is to be availed responsive to a resource request. Meanwhile, key-value pairs corresponding to whether a request was received on a weekend versus a weekday is relatively highly informative in this regard. Based on this data, tasks to identify key-value pairs associated with low information value may be discontinued.

Figure 3A:
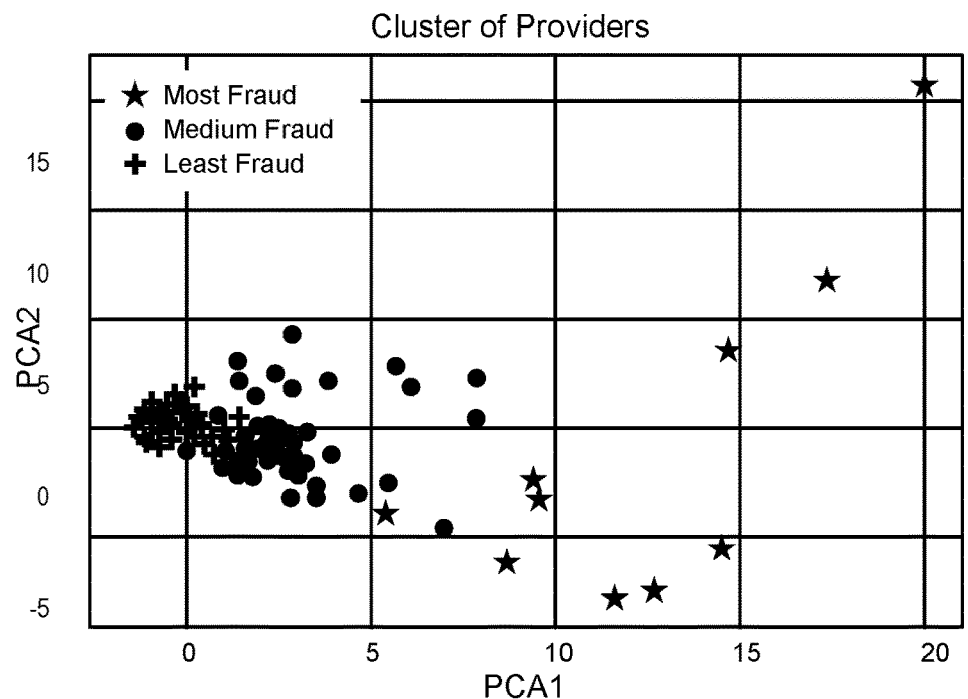
FIGS. 3a-3b illustrate exemplary representations of entity-specific request responses positioned in a transformed space.
Figure 3B:
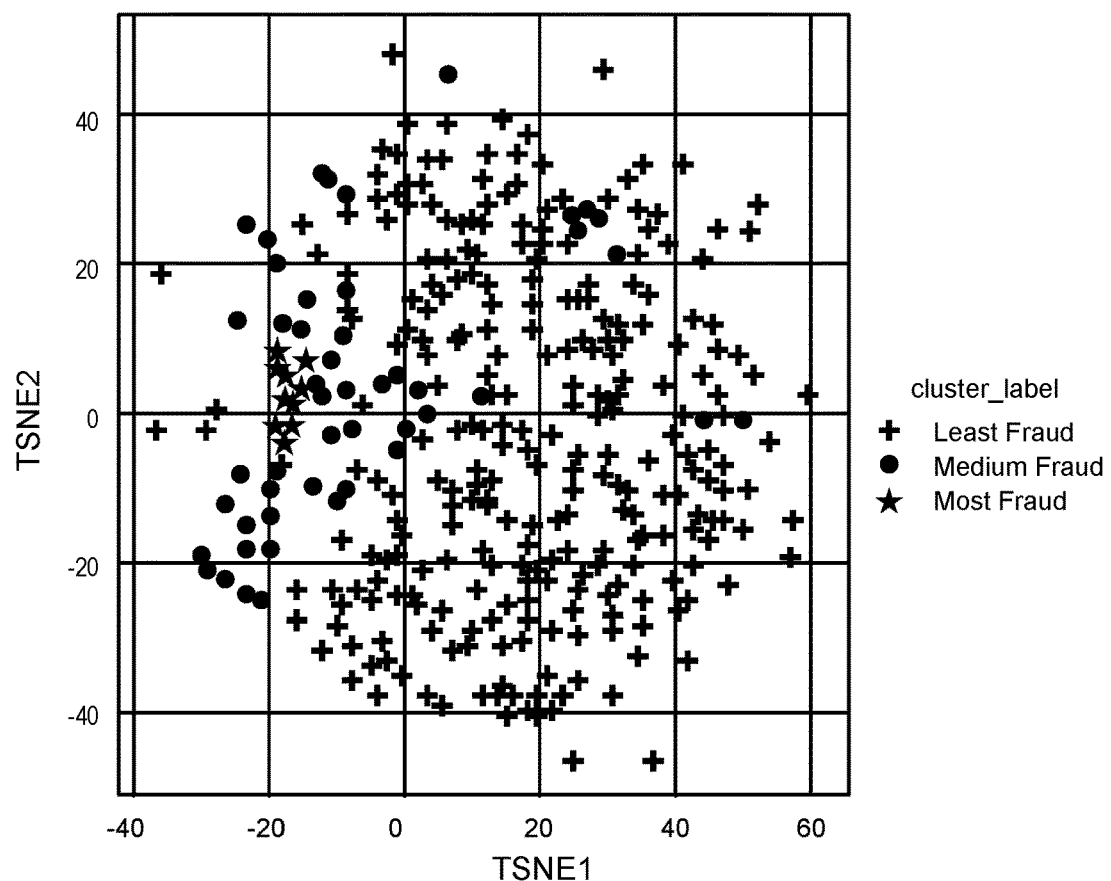

FIGS. 3a-3b illustrate exemplary representations of entity-specific request responses positioned in a transformed space. In each of FIG. 3a and FIG. 3b, each plotted point represents an entity, and the position of the point is determined based on resource requests received that were associated with the entity and responses to the requests. For each entity, a plurality of observations can be generated based on corresponding requests and responses. For example, an observation may identify (based on entity-associated requests) an average number of requests received per week, a variance of a number of requests received per week across weeks, a probability that a request identified a referring entity, an average number of requests received that identified a same subject, a fraction of received requests that identified a same type of event, a fraction of received requests that identified a subject that met a particular demographic criterion; etc.

Each plurality of observations can be transformed to generate, for each of a plurality of transformed dimensions, a score. Thus, FIG. 3a shows component scores for each of the first and second principal components. FIG. 3b shows two-dimensional projections using t-SNE (t-distributed Stochastic Neighbor Embedding). For each entity, a fraction of requests that were rejected (e.g., and/or a statistic representing a degree to which an amount of an availed resource was less than an amount of a requested resource) can be generated and used to assign the entity to one of three fraud categories (e.g., based on predefined thresholds). The color and shape of the depicted data points represent these categorizations. As shown, the first dimension is rather predictive of the category. Thus, this data exemplifies how population-level analyses may be used to generate augmenting data to associate with particular types of data points (e.g., entities, zip codes, event types, etc.). Specifically, a set of resource requests can be divided based on a value of a particular key-value pair (and/or a processed version of values from multiple key-value pairs), and data from each subset of the set of requests can be used to estimate a degree to which resource requests associated with the value(s). This information can subsequently be retrieved to inform processing associated with particular values of the particular key-value pair.

Figure 4:
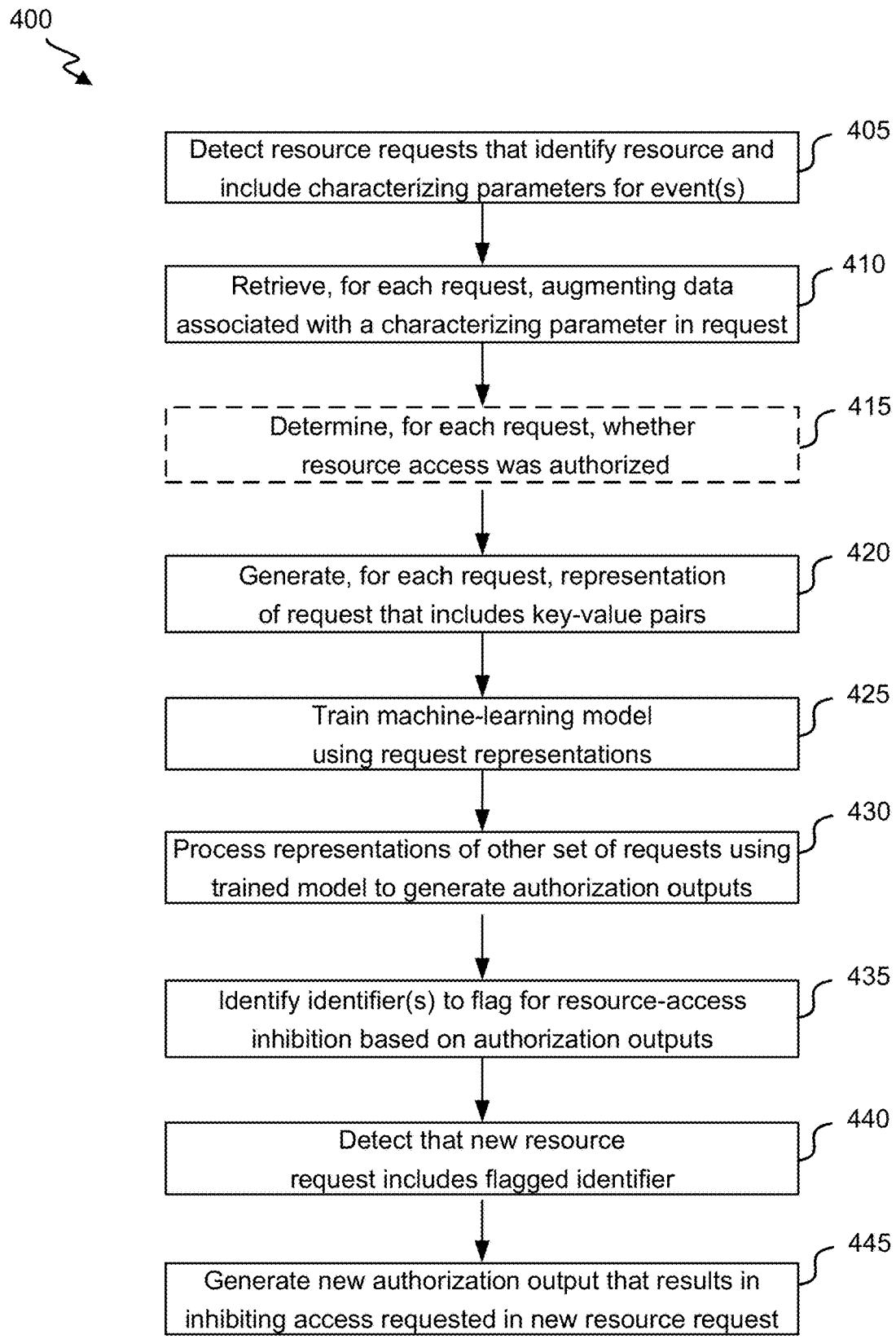
FIG. 4 shows a process for training and using a machine-learning model to process resource requests according to an embodiment of the invention.

FIG. 4 shows a process 400 for training and using a machine-learning model to process resource requests according to an embodiment of the invention. Process 400 can be performed (for example) by resource processing system 115.

Process 400 begins at block 405 where receipt of each of a set of resource requests is detected. Each resource request of the set of resource requests can include one received from a user device and that includes an identification of a requested resource and authorization-supporting data for receiving the requested resource. The authorization-supporting data can include one or more characterizing parameters that characterize one or more events that provide support for the requested resource access.

At block 410, for each resource request of the set of resource requests, augmenting data (e.g., associated with a characterizing parameter of the one or more characterizing parameters included in the resource request) is retrieved from a data source or data structure that is separate from the user devices from which the set of resource requests were received. In some instances, block 410 includes transmitting a request (e.g., that includes one or more identifiers and/or one or more characterizing parameters) to a remote computer system. In some instances, block 410 includes querying a locally and/or remotely managed data structure (e.g., using one or more identifiers and/or one or more characterizing parameters).

At optional block 415, for each resource request of the set of resource requests, a determination is made as to whether the requested resource access was authorized. The determination may be made based on (for example) on a stored indication of a response provided to the request, which may (but need not) be indicated in at least part of the augmenting data. In some instances, the determination can further assess the type of response generated for the request. For example, in addition to determining whether a response fully granted or fully rejected a request, an additional option may represent instances in which a response granted access to only a fraction of a requested resource.

At block 420, for each resource request of the set of resource requests, a representation of the request is generated. The representation can include a set of key-value pairs. Each of at least some of the set of key-value pairs can include a value extracted from or derived from the resource request. In some instances, a value is derived from the resource request in that a particular processing is performed to transform one or more values extracted from the request (and possibly further one or more other values) into a value for the key-value pair. In some instances, the set of key-value pairs includes one or more pairs that include a value that includes or is derived from augmenting data (e.g., identifying information that a database has associated with an entity identified in the request and/or a number of requests received from a particular user device that identify a same subject within a predefined time window).

At block 425, a machine-learning model is trained using the representations of the set of resource requests. In some instances, the training is unsupervised and does not include data indicating a response provided to each request. In some instances, the training is supervised and does include data indicating a response provided to each request. Training the machine-learning model can include (for example) setting or modifying one or more parameters, which can include one or more coefficients, weights, thresholds, etc. Training the machine-learning model can further or alternatively include (for example) defining one or more dimensionality definitions and/or transformed dimensions. The trained model can indicate (or can be explored to discover) differential degrees to which an authorization output of the model depends on a given key-value input. For example, a particular key-value pair may be informative (e.g., in an information-theoretical sense) and/or predictive to an extent that is greater than a predefined threshold, while another particular key-value pair may not. As another example, a weight of a particular key-value pair in each top dimension in a reduced-dimensionality space (with a top dimension as being defined as being each within a subset of dimensions that account for a threshold degree of variance in the data) may be above a predefined threshold, while another particular key-value pair may not. Thus, learned parameters can be used to identify one or more first keys identified in the set of key-value pairs on which an output of the machine-learning model is dependent (e.g., statistically dependent, dependent to at least a threshold absolute degree and/or dependent to at least a threshold relative to degree). For example, the one or more first keys may be defined to be associated with the four types of key-value pairs that have a highest weight in a first principal component, or the one or more first keys may be defined to be associated with each key-value pair associated with any first-to-second-layer weighting in a neural-network model that exceeds 0.5.

At block 430, for each other resource request in another set of resource requests, another representation of the other request is processed using the trained machine-learning model to generate an authorization output. In some instances, the representations of the other requests is of a similar or same form (e.g., in terms of how the representations were determined based on request data and/or augmenting data) to representations generated at block 420. The other set of resource requests may include requests received after the set of resource requests. The authorization outputs can include (for example) numeric outputs, categorical outputs, binary outputs, etc. For example, an authorization output can include a score along a double-bounded continuum indicating whether it is estimated that access to the requested resource is to be granted. As another example, an authorization output can include a selected categories from amongst multiple predefined categories (e.g., indicating that a request is to either be approved or subject to additional review). As yet another example, an authorization output can include a numeric output that indicates a percentage of an amount of a requested resource that it is estimated is authorized for access.

At block 435, one or more identifiers to flag for resource-access inhibition are identified based on the authorization outputs. The identification can be based on a population analysis across multiple requests. For example, the population analysis may pertain to requests received over a period of time such as a week, month or year. The population analysis may, but need not, identify particular types of parameters or key-value pairs across which corresponding requests are to be identified. For example, the population analysis may include separately aggregating data for all requests that identify a particular entity (or subject or type of event). The population analysis may include generating, for each aggregated set of requests, one or more statistics based on corresponding authorization outputs and/o responses. For example, a fraction of requests that were entirely rejected (or reduced by at least a predefined percentage or subject to additional review) may be identified. The flagged identifiers can correspond to identifiers (e.g., entities, subjects or types of events) that are associated with (for example) statistics that exceed (or are below) a predefined absolute or relative threshold, clustered into a cluster having a particular label, or are identified as an outlier based on one or more statistics and distribution assumptions. Each of the one or more identifiers may be of a data type that is different than the one or more first keys. For example, a trained configuration of the model may (in a given instance) not be configured such that an authorization output depends on an identifier of an entity, though a cross-request population analysis may indicate that the identities of some entities are informative as to authorization results.

At block 440, it is detected that a new resource request includes an identifier (e.g., a particular characterizing parameter) of the one or more flagged identifiers. In some instances, it may alternatively or additionally be determined that a value derived from an identifier (e.g., particular a characterizing parameter) of the request is one of the flagged identifiers. For example, this detection may include detecting that a request identifies an entity that was flagged for resource-access inhibition at block 435.

At block 445, a new authorization output is generated for the new resource request. Release of the new authorization output can result in inhibiting access to the resource requested in the new resource request. For example, the new authorization output can trigger queuing the new resource request for agent review, generating (e.g., and transmitting) a response that indicates that the requested access is denied and/or generating (e.g., and transmitting) a response that indicates that access only to a reduced-amount resource is granted.

In some instances, a single event or a series of events can involve multiple (non-subject) entities. For example, a first entity may refer a subject to a second entity, and the second entity can then perform one or more tasks associated with the event. As another example, one or more requests may indicating that a task performed for a subject was performed by a first entity that was different than a second entity that issued a prescription that had an association (e.g., temporal association and/or rationale association) with the task. In some instances, evaluating the frequency and extent to which particular entities are linked to one or more other entities through events or event series can provide an indication as to whether resource requests associated with the particular entities are fraudulent and/or unauthorized. Generation of an event-interaction network can facilitate tracking such instances.

Figure 5:
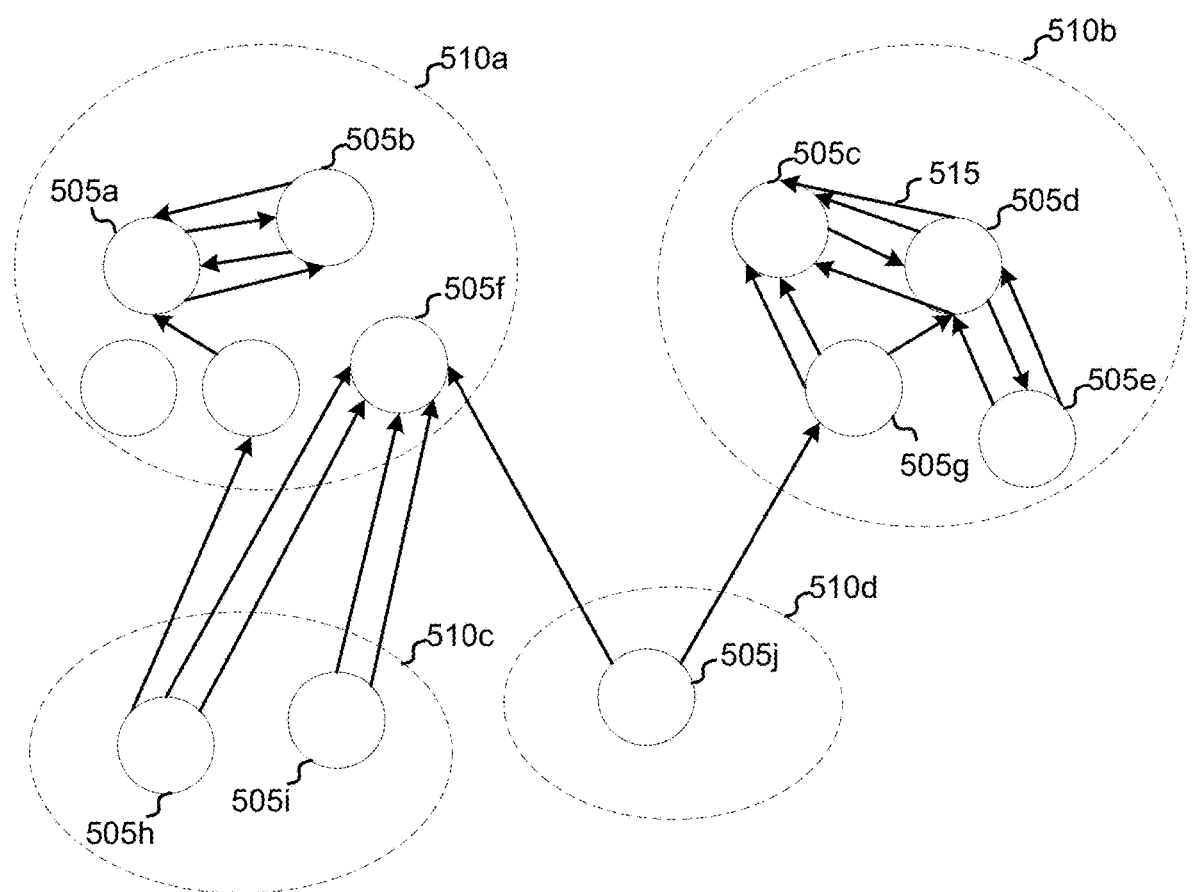
FIG. 5 illustrates an exemplary representation of an event-interaction network generated based on processing resource requests.

FIG. 5 illustrates an exemplary representation of an event-interaction network generated based on processing resource requests. In this depiction, each solid-line circle 505 represents an entity, and each dashed-line circle 510 represents a geographical area at which entities positioned within the circle perform tasks for various events. Connections 515 between entities can indicate that each of the connected entities was involved in a same event or series of events (e.g., pertaining to a same subject, condition and/or date range). In this instance, each connection 515 is directional and indicates that one entity (represented as being connected to the straight edge) referred a subject to another entity (represented as being connected to the arrow edge).

In the depicted instance, each of a first set of entities is associated with a high number of connections 515. For some of these entities (e.g., see 505*a*, 505*b*, 505*c*, 505*d*), connections with another entity extend in both directions. For others of these entities (e.g., see 505*f*, 505*g*, 505*h*, 505*i*, 505*j*), connections with each other entity extend in a single direction (though 505*g* has first connections with two entities that extend in a different direction than a second connection with a different third entity).

In some instances, augmenting data can be generated for an entity based on connection analysis. For example, augmenting data may identify (using data for a predefined time period): a number of event-associated connections corresponding to the entity; a number of event-associated connections corresponding to the entity and being in a particular direction (e.g., representing a role in a particular type of interaction); a number of other entities to which the entity is connected (e.g., via at least one connection or other threshold quantity); a mean, median, mode, variance or other statistic of a fraction of connections with individual other entities that are in a particular direction; etc. A machine-learning model may use this data to identify connection characteristics that support outputs indicating that a resource request is (or is not) authorized. For example, it may be determined that observing a high number of connections that extend in both directions between two entities is predictive that a request that identifies either of the two entities is not authorized. Meanwhile, potentially observing a high number of connections that extend in a single direction between two entities may not be predictive of authorization outputs (e.g., and may instead correspond to specialization distinctions). Augmenting data may further be based on geographical areas. For example, augmenting data may include indications of any of the above-listed metrics but only as they pertain to connections within a same geographical area or only as they pertain to connections across different geographical areas. For example, a machine-learning model may learn that cross-area connections are less indicative of unauthorized requests than are same-area connections.

Figure 6:
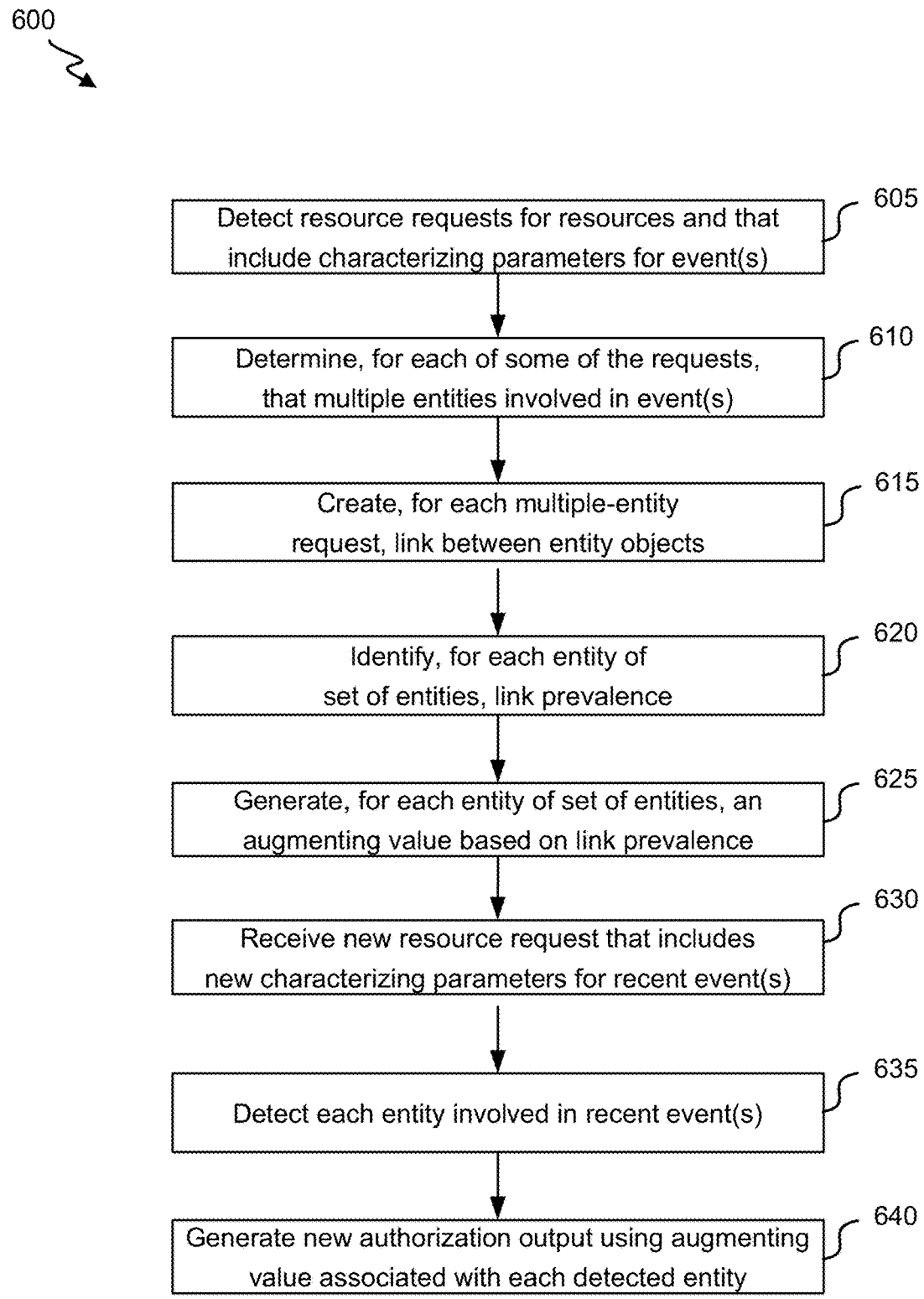
FIG. 6 shows a process for generating links between entity objects and using the links in request processing.

FIG. 6 shows a process 600 for generating links between entity objects and using the links in request processing. Process 600 can be performed (for example) by resource processing system 115.

Process 600 begins at block 605 where receipt of each of a set of resource requests is detected. Each resource request of the set of resource requests can include one received from a user device and that includes an identification of a requested resource and authorization-supporting data for receiving the requested resource. The authorization-supporting data can include one or more characterizing parameters that characterize one or more events that provide support for the requested resource access.

At block 610, a determination can be made, for each of some of the set of requests, that multiple entities were involved in the one or more events. For example, a determination can be made (e.g., based on the request and/or one or more other requests) when any first entity referred a subject to a second entity that performed a task associated with the one or more events. In some instances, block 610 includes identifying a subject characterizing parameter and condition characterizing parameter and performing a look-up function (e.g., using a locally managed data store or remote data source) to determine whether an instant request was preceded by another request identifying a different entity.

At block 615, for each of the some of the set of requests for which it was determined to have multiple entity involvements, a link is created to connect objects corresponding to the multiple entities. Creating the link can include (for example) updating a data element (e.g., file or portion thereof) that corresponds to a first of the multiple entities to identify a second of the multiple entities and the request (e.g., and to update a data element of the second entity in a similar manner). In some instances, the link identifies a directionality and/or type of relationship.

At block 620, for each entity of a set of entities, a link prevalence is identified using the links and/or entity objects. The link prevalence may be generated based on links generated within a predefined time period or that were associated with event dates within a predefined time period. A link prevalence may indicate (for example) a number of links connected to an object of the entity, a fraction of requests that identified the entity that also were associated with a link, a fraction or number of links connected to the entity object that have a particular directionality (e.g., to or from the object), and/or a fraction or number of links representing a particular type of connection between the entities.

At block 625, for each entity of the set of entities, an augmenting value is generated based on the identified link prevalence. The augmenting value may represent an estimated probability that a request that identifies the entity accords with resource-access rules (e.g., as opposed to requesting unauthorized access). In some instances, the augmenting value is generated based on a static algorithm that depends on link prevalence. In some instances, the augmenting the value is learned by a machine-learning model. Generating the augmenting value may include (for example) selecting a number along a (bounded, uni-bounded or double-bounded) range or selecting one of multiple discrete numbers. For example, a scale may be defined such that 1 represents an estimate that a request accords with authorization rules, −1 represents an estimate that a request does not accord with authorization rules, and 0 represents that the entity is not informative as to whether a request is authorized.

At block 630, a new resource request is received. The new resource request can include one received from a user device that is different than each user device from which the set of resource requests were received or from one of the user devices from which at least one of the set of resource requests were received. The new resource request can include an identification of a newly requested resource and new authorization-supporting data. The new authorization-supporting data can include one or more new characterizing parameters that characterize one or more recent events that provide support for the requested resource access.

At block 635, a detection of each entity involved in the one or more recent events can be performed. The detection can be performed using at least one of the one or more new characterizing parameters. In some instances, the detection includes each entity identifier included in the one or more new characterizing parameters. In some instances, the detection includes using at least one of the one or more new characterizing parameters (e.g., a parameter that identifies a subject and possibly a condition) to look up each request associated with the same at least one of the one or more new characterizing parameters. Each entity identifier in each of the looked-up requests can then be included as a detected entity. In some instances, a role for each entity is further identified.

At block 640, a new authorization output is generated for the new request based on the augmenting value(s) associated with each of the detected entity/entities. For example, block 640 can include generating an input data set that includes the augmenting value(s) and/or a metric dependent thereupon and processing the input data set using (for example) a trained machine-learning model, such as a model of a type described herein. The new authorization output can be of an authorization-output type described herein. The new authorization output may result in (for example) generating and transmitting an instruction to avail part or all of the requested resource, triggering transmission of part or all of the requested resource, queuing the request for agent review, generating and transmitting a response communication (e.g., identifying whether and/or an extent to which access to the requested resource is approved and/or updating a data record (and/or metadata) associated with the request to include the new authorization output and potentially any subsequent response indicator.

Techniques disclosed herein improve security of resources by detecting indicators of unauthorized use requests. Notably, the indicator(s) may partly or completely extend beyond data included within a resource-access requests. For example, the indicator(s) may depend on augmenting data (e.g., collected from a separate source or data structure) and/or transmission properties detected at a request-receiving device. The machine-learning model can facilitate efficiently and effectively flagging requests for further process or review, which can improve the general operation and reduce processing speeds at the request processing system.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
one or more data processors; and
a non-transitory computer readable storage medium containing instructions which, when executed on the one or more data processors, cause the one or more data processors to perform actions including:
detecting receipt of a first set of resource requests, wherein each resource request of the first set of resource requests was received from a user device of a plurality of user devices, wherein resource requests correspond to a claim on an insurance policy and include:
an identification of a requested resource, the requested resource being a particular amount of payment for one or more previous medical-service events; and authorization-supporting data for receiving the requested resource, wherein the authorization-supporting data includes one or more characterizing parameters that characterize the one or more previous medical-service events;

for each resource request of the first set of resource requests:

retrieving, from a data source or data structure that is separate from the plurality of user devices from which the first set of resource requests were received, augmenting data by executing a database look-up using a particular characterizing parameter of the one or more characterizing parameters included in the resource request, wherein identifies an entity that performed the one or more previous medical-service events identified by the resource request, and wherein the augmenting data includes an identification of one or more additional resource requests that are associated with a same entity; and generating a representation of the resource request that includes a set of key-value pairs, wherein each of at least some of the set of key-value pairs includes a value extracted from or derived from the resource request;

training a machine-learning model using the representations of the first set of resource requests and augmenting-based data that includes or is derived from the augmenting data, wherein the trained machine-learning model includes a dependency between one or more first keys identified in the set of key-value pairs and an output;

receiving a second set of resource requests after the first set of resource requests, wherein each resource request of the second set of resource requests was received from a user device of the plurality of user devices, and wherein each resource request of the second set of resource requests does not include an authorization output;

processing, for each resource request of the second set of resource requests, a representation of the resource request using the trained machine-learning model to generate an authorization output;

identifying, based on a population analysis of the authorization outputs, one or more identifiers to flag for inhibition of resource access, wherein the one or more identifiers do not correspond to the one or more first keys;

detecting that a new resource request includes an identifier of the one or more identifiers, wherein the new resource request identifies a particular resource and corresponds to a particular medical-service provider; and generating a new authorization output for the new resource request, wherein release of the new authorization output results in inhibiting the particular medical-service provider from access the particular resource.

2. The system of claim 1, wherein the actions further include, for each resource request of the set of resource requests, determining whether access to the requested resource was authorized based on predefined access criteria; wherein training of the machine-learning model is further based on indications of whether corresponding access to the requested resources were determined to be authorized.

3. The system of claim 1, wherein, for a resource request of the at least one of the set of resource requests, the augmenting data includes one or more statistics generated based on multiple previously processed resource requests, wherein each of the multiple previously processed resource requests includes at least one of the one or more characterizing parameters included in the resource request.

4. The system of claim 1, wherein, for a resource request of the at least one of the set of resource requests, the augmenting data includes a threshold for a stereotyped request pattern corresponding to the one or more previous medical-service events or a series of previous medical-service events that includes the one or more previous medical-service events.

5. The system of claim 1, wherein, for each other resource request of a subset of the other set of resource requests, the authorization output indicates that access to a given resource requested in the other resource request is to be inhibited, and wherein the actions further include:

inhibiting, for each other resource request of the other set of resource requests, access to the given resource by queuing the other resource request for additional processing and information retrieval.

6. The system of claim 1, wherein the training the machine-learning model is further based on the augmenting data retrieved for the set of resource requests.

7. The system of claim 1, wherein training the machine-learning model includes generating a set of components, wherein each component of the set of components includes a set of weights corresponding to keys in the set of key-value pairs generated for the set of resource requests.

8. The system of claim 1, wherein processing, for each other resource request in the other set of resource requests, the other representation of the other resource request includes assigning the other resource request to one of multiple clusters, wherein each of the multiple clusters is associated with a different authorization output.

9. The system of claim 1, wherein, for each other resource request in the other set of resource requests, processing the other representation of the other resource request is further based on the augmenting data.

10. A computer-implemented method comprising:

detecting receipt of a first set of resource requests, wherein each resource request of the first set of resource requests was received from a user device of a plurality of user devices, wherein resource requests correspond to a claim on an insurance policy and include:

an identification of a requested resource, the requested resource being a particular amount of payment for one or more previous medical-service events; and authorization-supporting data for receiving the requested resource, wherein the authorization-supporting data includes one or more characterizing parameters that characterize the one or more previous medical-service events;

for each resource request of the set of resource requests:

retrieving, from a data source or data structure that is separate from the plurality of user devices from which the first set of resource requests were received, augmenting data by executing a database look-up using a particular characterizing parameter of the one or more characterizing parameters included in the resource request, wherein the augmenting data identifies an entity that performed the one or more previous medical-service events identified by the resource request, and wherein the augmenting data includes an identification of one or more additional resource requests that are associated with a same entity; and generating a representation of the resource request that includes a set of key-value pairs, wherein each of at least some of the set of key-value pairs includes a value extracted from or derived from the resource request;

training a machine-learning model using the representations of the first set of resource requests and augmenting-based data that includes or is derived from the augmenting data, wherein the trained machine-learning model includes a dependency between one or more first keys identified in the set of key-value pairs and an output;

receiving a second set of resource requests after the first set of resource requests, wherein each resource request of the second set of resource requests was received from a user device of the plurality of user devices, and wherein each resource request of the second set of resource requests does not include an authorization output;

processing, for each resource request of the second set of resource requests, a representation of the resource request using the trained machine-learning model to generate an authorization output;

identifying, based on a population analysis of the authorization outputs, one or more identifiers to flag for inhibition of resource access, wherein the one or more identifiers do not correspond to the one or more first keys;

detecting that a new resource request includes an identifier of the one or more identifiers, wherein the new resource request identifies a particular resource and corresponds to a particular medical-service provider; and generating a new authorization output for the new resource request, wherein release of the new authorization output results in inhibiting the particular medical-service provider from access the particular resource.

11. The computer-implemented method of claim 10, further comprising, for each resource request of the set of resource requests, determining whether access to the requested resource was authorized based on predefined access criteria;

wherein training of the machine-learning model is further based on indications of whether corresponding access to the requested resources were determined to be authorized.

12. The computer-implemented method of claim 10, wherein, for a resource request of the at least one of the set of resource requests, the augmenting data includes one or more statistics generated based on multiple previously processed resource requests, wherein each of the multiple previously processed resource requests includes at least one of the one or more charactering parameters included in the resource request.

13. The computer-implemented method of claim 10, wherein, for a resource request of the at least one of the set of resource requests, the augmenting data includes a threshold for a stereotyped request pattern corresponding to the one or more previous medical-service events or a series of previous medical-service events that includes the one or more previous medical-service events.

14. The computer-implemented method of claim 10, wherein, for each other resource request of a subset of the other set of resource requests, the authorization output indicates that access to a given resource requested in the other resource request is to be inhibited, and wherein the method further includes:

inhibiting, for each other resource request of the other set of resource requests, access to the given resource by queuing the other resource request for additional processing and information retrieval.

15. The computer-implemented method of claim 10, wherein the training the machine-learning model is further based on the augmenting data retrieved for the set of resource requests.

16. The computer-implemented method of claim 10, wherein training the machine-learning model includes generating a set of components, wherein each component of the set of components includes a set of weights corresponding to keys in the set of key-value pairs generated for the set of resource requests.

17. The computer-implemented method of claim 10, wherein processing, for each other resource request in the other set of resource requests, the other representation of the other resource request includes assigning the other resource request to one of multiple clusters, wherein each of the multiple clusters is defined based on at least part of the one or more parameters and is associated with a different authorization output.

18. The computer-implemented method of claim 10, wherein, for each other resource request in the other set of resource requests, processing the other representation of the other resource request is further based on the augmenting data.

19. A computer-program product tangibly embodied in a non-transitory machine-readable storage medium, including instructions configured to cause one or more data processors to perform actions including:

detecting receipt of a first set of resource requests, wherein each resource request of the first set of resource requests was received from a user device of a plurality of user devices, wherein resource requests correspond to a claim on an insurance policy and include:

an identification of a requested resource, the requested resource being a particular amount of payment for one or more previous medical-service events; and authorization-supporting data for receiving the requested resource, wherein the authorization-supporting data includes one or more characterizing parameters that characterize the one or more previous medical-service events;

for each resource request of the first set of resource requests:

retrieving, from a data source or data structure that is separate from the plurality of user devices from which the first set of resource requests were received, augmenting data by executing a database look-up using a particular characterizing parameter of the one or more characterizing parameters included in the resource request, wherein the augmenting data identifies an entity that performed the one or more previous medical-service events identified by the resource request, and wherein the augmenting data includes an identification of one or more additional resource requests that are associated with a same entity; and generating a representation of the resource request that includes a set of key-value pairs, wherein each of at least some of the set of key-value pairs includes a value extracted from or derived from the resource request;

training a machine-learning model using the representations of the first set of resource requests and augmenting-based data that includes or is derived from the augmenting data, wherein the trained machine-learning model includes a dependency between one or more first keys identified in the set of key-value pairs and an output;

receiving a second set of resource requests after the first set of resource requests, wherein each resource request of the second set of resource requests was received from a user device of the plurality of user devices, and wherein each resource request of the second set of resource requests does not include an authorization output;

processing, for each resource request of the second set of resource requests, a representation of the resource request using the trained machine-learning model to generate an authorization output;

identifying, based on a population analysis of the authorization outputs, one or more identifiers to flag for inhibition of resource access, wherein the one or more identifiers do not correspond to the one or more first keys;

detecting that a new resource request includes an identifier of the one or more identifiers, wherein the new resource request identifies a particular resource and corresponds to a particular medical-service provider; and generating a new authorization output for the new resource request, wherein release of the new authorization output results in inhibiting the particular medical-service provider from access the particular resource.

20. The computer-program product of claim 19, further comprising, for each resource request of the set of resource requests, determining whether access to the requested resource was authorized based on predefined access criteria;

wherein training of the machine-learning model is further based on indications of whether corresponding access to the requested resources were determined to be authorized.

* * * * *

UNITED STATES PATENT AND TRADEMARK OFFICE
CERTIFICATE OF CORRECTION

PATENT NO. : 10,805,305 B2
APPLICATION NO. : 16/269514
DATED : October 13, 2020
INVENTOR(S) : Theja Birur It is certified that error appears in the above-identified patent and that said Letters Patent is hereby corrected as shown below:

In the Claims

At Column 19, Line 58, in Claim 2, replace:
"include, for each resource request of the set of resource"
With:
--include, for each resource request of the first set of resource--

At Column 19, Line 66, in Claim 3, replace:
"of the at least one of the set of resource requests, the"
With:
--of the at least one of the first set of resource requests, the--

At Column 20, Line 6, in Claim 4, replace:
"of the at least one of the set of resource requests, the"
With:
--of the at least one of the first set of resource requests, the--

At Column 20, Lines 12-20, in Claim 5, replace:
"5. The system of claim 1, wherein, for each other resource request of a subset of the other set of resource requests, the authorization output indicates that access to a given resource requested in the other resource request is to be inhibited, and wherein the actions further include:
inhibiting, for each other resource request of the other set of resource requests, access to the given resource by queuing the other resource request for additional processing and information retrieval."
With:
--5. The system of claim 1, wherein, for each resource request of a subset of the second set of resource requests, the authorization output indicates that access to a given resource requested in the resource request is to be inhibited, and wherein the actions further include:
inhibiting, for each resource request of the second set of resource requests, access to the given resource by queuing the resource request for additional processing and information retrieval.--

Signed and Sealed this
Thirteenth Day of December, 2022

Katherine Kelly Vidal
*Director of the United States Patent and Trademark Office*

CERTIFICATE OF CORRECTION (continued)
U.S. Pat. No. 10,805,305 B2

At Column 20, Line 24, in Claim 6, replace:
"data retrieved for the set of resource requests."
With:
--data retrieved for the first set of resource requests.--

At Column 20, Line 29, in Claim 7, replace:
"pairs generated for the set of resource requests."
With:
--pairs generated for the first set of resource requests.--

At Column 20, Lines 30-35, in Claim 8, replace:
"8. The system of claim 1, wherein processing, for each other resource request in the other set of resource requests, the other representation of the other resource request includes assigning the other resource request to one of multiple clusters, wherein each of the multiple clusters is associated with a different authorization output."
With:
--8. The system of claim 1, wherein processing, for each resource request of the second set of resource requests, the representation of the resource request includes assigning the resource request to one of multiple clusters, wherein each of the multiple clusters is associated with a different authorization output.--

At Column 20, Lines 36-39, in Claim 9, replace:
"9. The system of claim 1, wherein, for each other resource request in the other set of resource requests, processing the other representation of the other resource request is further based on the augmenting data."
With:
--9. The system of claim 1, wherein processing, for each resource request of the second set of resource requests, the representation of the resource request is further based on the augmenting data.--

At Column 20, Line 55, in Claim 10, replace:
"for each resource request of the set of resource requests:"
With:
--for each resource request of the first set of resource requests:--

At Column 21, Line 39, in Claim 11, replace:
"ther comprising, for each resource request of the set of "
With:
--ther comprising, for each resource request of the first set of--

At Column 21, Line 48, in Claim 12, replace:
"wherein, for a resource request of the at least one of the set"
With:
--wherein, for a resource request of the at least one of the first set--

At Column 21, Line 56, in Claim 13, replace:
"wherein, for a resource request of the at least one of the set"

CERTIFICATE OF CORRECTION (continued)
U.S. Pat. No. 10,805,305 B2

With:
--wherein, for a resource request of the at least one of the first set--

At Column 21, Lines 62-67, in Claim 14, replace:
"14. The computer-implemented method of claim 10, wherein, for each other resource request of a subset of the other set of resource requests, the authorization output indicates that access to a given resource requested in the other resource request is to be inhibited, and wherein the method further includes:"
With:
--14. The computer-implemented method of claim 10, wherein, for each resource request of a subset of the second set of resource requests, the authorization output indicates that access to a given resource requested in the resource request is to be inhibited, and wherein the method further includes:--

At Column 22, Lines 1-4, in Claim 14, replace:
"inhibiting, for each other resource request of the other set of resource requests, access to the given resource by queuing the other resource request for additional processing and information retrieval."
With:
--inhibiting, for each resource request of the second set of resource requests, access to the given resource by queuing the resource request for additional processing and information retrieval.--

At Column 21, Line 7, in Claim 15, replace:
"based on the augmenting data retrieved for the set of"
With:
--based on the augmenting data retrieved for the first set of--

At Column 21, Line 13, in Claim 16, replace:
"keys in the set of key-value pairs generated for the set of"
With:
--keys in the set of key-value pairs generated for the first set of--

At Column 22, Lines 15-22, in Claim 17, replace:
"17. The computer-implemented method of claim 10, wherein processing, for each other resource request in the other set of resource requests, the other representation of the other resource request includes assigning the other resource request to one of multiple clusters, wherein each of the multiple clusters is defined based on at least part of the one or more parameters and is associated with a different authorization output."
With:
--17. The computer-implemented method of claim 10, wherein processing, for each resource request in the second set of resource requests, the representation of the resource request includes assigning the other resource request to one of multiple clusters, wherein each of the multiple clusters is defined based on at least part of the one or more characterizing parameters and is associated with a different authorization output.--

At Column 22, Lines 23-27, in Claim 18, replace:

"18. The computer-implemented method of claim 10, wherein, for each other resource request in the other set of resource requests, processing the other representation of the other resource request is further based on the augmenting data."
With:
--18. The computer-implemented method of claim 10, wherein, for each resource request in the second set of resource requests, processing the representation of the resource request is further based on the augmenting data.--